(12) United States Patent
Zhao et al.

(10) Patent No.: US 12,151,986 B2
(45) Date of Patent: Nov. 26, 2024

(54) METHOD FOR PHOTOCATALYTIC FOLIAR FERTILIZATION

(71) Applicant: ZHEJIANG UNIVERSITY, Hangzhou (CN)

(72) Inventors: Weirong Zhao, Hangzhou (CN); Yifan Liu, Hangzhou (CN); Yingying Ma, Hangzhou (CN); Shanshan Guo, Hangzhou (CN); Lulu Yao, Hangzhou (CN); Chenyang Huangfu, Hangzhou (CN); Zirui Yu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 891 days.

(21) Appl. No.: 17/235,880

(22) Filed: Apr. 20, 2021

(65) Prior Publication Data
US 2021/0355043 A1 Nov. 18, 2021

(30) Foreign Application Priority Data
May 13, 2020 (CN) .......................... 202010402020.7

(51) Int. Cl.
*C05C 3/00* (2006.01)
(52) U.S. Cl.
CPC ..................... *C05C 3/00* (2013.01)
(58) Field of Classification Search
CPC ................. C05C 3/00; A01C 21/005
See application file for complete search history.

(56) References Cited

U.S. PATENT DOCUMENTS

2013/0253073 A1* 9/2013 Ling .................... B01J 37/0045
502/200

FOREIGN PATENT DOCUMENTS

JP 2001247866 A * 9/2001 ............... C05G 5/40

OTHER PUBLICATIONS

Liu, Yifan, et al. "Environmentally Friendly Non-Metal Solar Photocatalyst C3N4 for Efficient Nitrogen Fixation as Foliar Fertilizer." ChemistrySelect 5.26 (2020): 7720-7727. (Year: 2020).*
Zhao et al., Enhanced nitrogen photofixation on Fe-doped TiO2 with highly exposed (101) facets in the presence of ethanol as scavenger, Applied Catalysis B: Environmental 144 (2014) 468-47.
Hadi Diarmand-Khalilabad et al., g-C3N4 nanosheets decorated with carbon dots and CdS nanoparticles: Novel nanocomposites with excellent nitrogen photofixation ability under simulated solar irradiation, Ceramics International 45 (2019) 2542-2555.
Elham Vesali-Kermani et al., Nitrogen photofixation ability of g-C3N4 nanosheets/Bi2MoO6 heterojunction photocatalyst under visible-light illumination Journal of Colloid and Interface Science 563(2020)81-91.
Melvin et al., M-Au/TiO2 (M = Ag, Pd, and Pt) nanophotocatalyst for overall solar water splitting: role of interfaces, Nanoscale 7(2015)13477-13488.
Li et al., Photocatalytic H2 evolution for α-, β-, γ-Ga2O3 and suppres. of hydrolysis of Y-Ga2O3 by adjust.. pH, adding a sacrificial agent . . . , RSC Advances 6(2016)59450-59456.
Zhao et al., Enhanced quantum yield of nitrogen fixation for hydrogen storage with in situ-formed carbonaceous radicals, Chemical Communications 51(2015)4785-4788.

* cited by examiner

*Primary Examiner* — Jennifer A Smith
(74) *Attorney, Agent, or Firm* — Jiwen Chen; Joywin IP Law PLLC

(57) ABSTRACT

The invention discloses a photocatalytic foliar fertilization method, relating to agriculture technology. To be specific, the solution containing photocatalysts and polyols is sprayed on the leaves of crops to provide nitrogen fertilizer under sunlight; the photocatalysts are nanocatalysts responding to the sunlight spectrum, of which the conduction band position is lower than −0.092 V(vs NHE); the mass concentration of photocatalysts in the solution is 100~2000 mg/L, and the volume fraction of polyols accounts for 1%~20%. In the invention, with the introduction of hole sacrificial agents to constrain the annihilation of photogenerated carriers, the electrons can be generated over the catalysts under sunlight and then react with dinitrogen to form ammonia as nitrogen fertilizer on the leaves of crops. This method has no demand for extra supplementation of nitrogenous fertilizer. Besides, it improves the utilization rate of nitrogen with a simple, secure and convenient fertilization.

8 Claims, No Drawings

METHOD FOR PHOTOCATALYTIC FOLIAR FERTILIZATION

This application claims the priority benefit of Chinese Application No. 202010402020.7, filed May 13, 2020, which is hereby incorporated by reference.

BACKGROUND OF THE INVENTION

1. Field of the Invention

The present invention relates to the technical field of agriculture, in particular to a method for photocatalytic foliar fertilization.

2. Description of the Prior Art

Nitrogen of nucleic acid and protein in the human body comes from organic nitrogen in plants. Plants mainly absorb nitrogen in soil through their roots to obtain nutrients, while the nitrogen in soil is finite and needs to be supplemented by fertilization. Traditional fertilization method is soil fertilization with low utilization efficiency, wherein the nutrients can be easily leached, volatilized, or fixed by the soil. Moreover, it brings about some environmental problems such as water eutrophication, soil acidification, soil compaction, and greenhouse effect. In contrast, the foliar fertilization, featuring low nutrients concentration and high utilization efficiency, has the preponderances of fast absorption and strong pertinence, and can serve as an auxiliary fertilization.

Therefore, the development of efficient and environmentally friendly foliar fertilizer guarantees for green and sustainable food production.

Nitrogen fertilizers for foliar fertilization are mainly in forms of urea, ammonium nitrogen ($NH_4^+$—N), nitrate nitrogen ($NO_3^-$—N), and amidonitrogen, which can be synthesized via industrial nitrogen fixation. The concentration of foliar nitrogen fertilizers ranges from 10 to 1000 mmol/L. Concentration that is too high results in probable leave-burnt, while low concentration increases the workload and fails to meet the requirements of supplementing nutrition. And most of the commonly used foliar nitrogen fertilizers are quick-acting fertilizers, whose effect period is short, usually 1-2 weeks per time.

The process of photocatalytic ammonia evolution is as follows: electrons and holes can be excited over catalysts under sunlight, wherein the electrons migrate to the conduction band and then reduce dinitrogen adsorbed on catalysts to produce ammonia; hole sacrificial agents are usually applied to oxidize holes remained on the valence band to inhibit photo-generated carrier recombination.

The literature (Enhanced nitrogen photofixation on Fe-doped $TiO_2$ with highly exposed (101) facets in the presence of ethanol as scavenger, Applied Catalysis B: Environmental 144 (2014) 468-477) researched the nitrogen photofixation over Fe doped $TiO_2$ with highly exposed (101) facets. The results showed that the potential of conduction band was −0.50 V (vs NHE) and the rate of nitrogen photofixation was 400 µmol/$g_{cat}$/hour. As is reported in the literature (g-$C_3N_4$ nanosheets decorated with carbon dots and CdS nanoparticles: Novel nanocomposites with excellent nitrogen photofixation ability under simulated solar irradiation, Ceramics International 45 (2019) 2542-2555), the optimal rate of nitrogen photofixation over g-$C_3N_4$ nanosheets decorated with carbon dots and CdS nanoparticles reached 3180 µmol/$g_{cat}$/L and the potential of conduction band was −1.25 V (vs NHE). In the literature (Nitrogen photofixation ability of g-$C_3N_4$ nanosheets/$Bi_2MoO_6$ heterojunction photocatalyst under visible-light illumination, Journal of Colloid and Interface Science 563(2020)81-91), the catalyst, g-$C_3N_4$ nanosheets/$Bi_2MoO_6$, possessed satisfactory efficiency of nitrogen photofixation (3271 µmol/$g_{cat}$/L) and the conduction band position was −0.66 V (vs NHE).

Hole sacrificial agents are always introduced to capture holes to inhibit the recombination of photogenerated electrons and holes in photocatalytic reactions. In the literature (M-Au/$TiO_2$ (M=Ag, Pd, and Pt) nanophotocatalyst for overall solar water splitting: role of interfaces, Nanoscale 7(2015)13477-13488), $Pt_{0.5}$—$Au_1$/$TiO_2$ was prepared via the photo-deposition method to evaluate the effect of solar water splitting. The results indicated that the evolution rate with the hole sacrificial agent methanol was 9 times as high as the evolution rate without methanol. Besides, the literature (Photocatalytic $H_2$ evolution for α-, β-, γ-$Ga_2O_3$ and suppression of hydrolysis of γ-$Ga_2O_3$ by adjusting pH, adding a sacrificial agent or loading a cocatalyst, RSC Advances 6(2016)59450-59456) revealed that the photocatalytic efficiency with γ-$Ga_2O_3$ and methanol was 2.5 times higher than that without methanol.

Alcohols are commonly used as sacrificial agents in the photocatalytic field. The reducibility of alcohols varies, which has impact on the photocatalytic efficiency. The study (Enhanced quantum yield of nitrogen fixation for hydrogen storage with in situ-formed carbonaceous radicals, Chemical Communications 51(2015)4785-4788) investigated the effect of different monohydric alcohols (methanol, ethanol, n-propanol, n-butanol) as hole sacrificial agents on the photocatalytic ammonia production of β-$Ga_2O_3$ in the photocatalytic ammonia production. It was pointed out that the reaction between the hole sacrificial agent and the hole is an oxidation reaction, and methanol owned a lower oxidation-reduction potential than other alcohols and was more likely to lose electrons and oxidize the holes, so the rate of ammonia yield is higher than other sacrificial agents.

However, there are no patents and literatures introducing the photocatalytic ammonia evolution into the application of foliar fertilization. As for the practical application of photocatalytic ammonia production in the agriculture, the critical point lies in whether it is capable of producing enough absorbable ammonia for crops.

SUMMARY OF THE INVENTION

The present invention provides a method for photocatalytic foliar fertilization: with the introduction of hole sacrificial agents to constrain the annihilation of photogenerated carriers, the electrons can be generated over the catalysts under sunlight and then react with dinitrogen to form ammonia as nitrogen fertilizer on the surface of leaves.

The object is achieved by the following technical solution. The method for photocatalytic foliar fertilization is spraying the solution containing photocatalysts and sacrificial agents on the surface of leaves, for the purpose of providing nitrogen fertilizer for crops under sunlight.

The photocatalysts are nano-catalysts that can respond to the sunlight spectrum, wherein the potential of conduction band should be below −0.092 V (vs NHE); the sacrificial agents are polyols; the concentration of photocatalysts in the solution is 100~2000 mg/L, and the volume fraction of sacrificial agents is 1%~20%.

On the basis of photocatalytic ammonia production, the supply system comprises environmentally friendly photocatalysts and biodegradable polyols for in-situ ammonia evolution or supply. During the daytime, the electrons can be generated over the catalysts under sunlight and then react with dinitrogen to form ammonia as nitrogen fertilizer on the surface of leaves, with the introduction of hole sacrificial agents to constrain the annihilation of photogenerated carriers. By the way, the ammonia can be simultaneously absorbed and utilized as controlled release fertilizers by crops and the concentration is appropriate so as not to damage leaves.

Moisture on the surface of leaves will also be consumed by transpiration. In this case, the selected polyols can serve as moisturizers to gather moisture from the surroundings to promote the ammonia production. In the meantime, the generated ammonia can be dissolved in water, beneficial for the utilization of crops.

In the process of spraying the fertilizer, selection for photocatalysts is of vital importance. Dinitrogen can react with photo-generated electrons to produce ammonia, and the potential of oxidation-reduction ($E(N_2/NH_3)$) is $-0.092$ V (vs NHE). Therefore, photocatalysts, with the potential of conduction band lower than $-0.092$ V (vs NHE), are capable of prompting the reduction. Besides, the conduction band potentials of all photocatalysts in the present invention are relative to the standard hydrogen electrode potential.

Preferably, the mass concentration of the photocatalyst in the solution for supplying ammonia is 250-1000 mg/L, and the volume fraction of the polyol accounts for 2.5%~10%. In this regard, the concentration of generated ammonia is appropriate so as not to damage the leaves, together with a suitable efficiency of ammonia production.

The nanocatalyst comprises one or more of vacancy-defected catalysts, non-metal doped catalysts, metal ion doped catalysts, and heterojunction catalysts.

Preferably, the vacancy-defected catalysts include but are not limited to nitrogen-defected $g-C_3N_4$ (the conduction band potential is $-0.85$ V (vs NHE)) and oxygen-defected ZnO (the conduction band potential is $-0.50$ V (vs NHE));

The non-metal doped catalysts include but are not limited to N doped $TiO_2$ (the conduction band potential is $-0.19$ V (vs NHE)) and O doped $g-C_3N_4$ (the conduction band potential is $-1.32$ V (vs NHE));

The metal ion doping catalysts include but are not limited to Fe doped $TiO_2$ (the conduction band potential is $-0.50$ V (vs NHE)) and Cu doped ZnO (the conduction band potential is $-0.56$ V (vs NHE));

The heterojunction catalysts include but are not limited to ZnO-reduced graphene oxide (the conduction band potential is $-0.31$ V (vs NHE)) and $g-C_3N_4$—$TiO_2$ (the conduction band potential is $-0.30$ V (vs NHE)).

In fact, the choice of nanocatalysts is not limited to the above, as long as the conduction band potential is lower than $-0.092$ V (vs NHE).

Preferably, the photocatalysts are nitrogen-defected $g-C_3N_4$ and O doped $g-C_3N_4$. The material $g-C_3N_4$ with strong response to sunlight, can be simply and easily synthesized in batch.

When the number of carbon atoms of hole sacrificial agents is same, the hole sacrificial agents with more hydroxyl groups show better ability of reduction. In this case, the stronger the ability of donating electrons, the faster the separation of photo-generated electrons and holes, which is beneficial for ammonia production. Preferably, the hole sacrificial agents include one or more of ethylene glycol, propylene glycol, glycerol, butanediol, butanetriol and pentanediol. Selected polyols should be nonvolatile and hydrophilic, which can absorb moisture from the surroundings when there is no light, so as to provide a reaction zone for ammonia production.

Preferably, glycerol and butanetriol possess better reduction ability than others. Especially, glycerol is a kind of by-products of biodiesel with high output, which can realize reclamation of wastes.

Preferably, the mass concentration of the photocatalysts is 250~600 mg/L, and the volume fraction of the polyols is 5%~8%. Low concentration of photocatalysts and polyols leads to insufficient efficiency of ammonia production; High concentration results in unnecessary waste.

Further preferably, the mass concentration of O doped $g-C_3N_4$ is 500 mg/L, and the volume fraction of glycerol is 5%.

Although the hydroscopicity, surface tension and adhesive force of the polyols is satisfactory, these polyols will be consumed as the reaction goes on. Consequently, the solution containing 1%~20% of polyols should be additionally sprayed periodically, and the interval ranges from 15 to 30 days.

Preferably, the appropriate volume fraction of the polyols in the additional solution is 2.5%~10%. The concentration of the polyols should not be too high or too low.

The edible parts of selected crops exclude leaves to guarantee food safety and human health. The selected crops include but are not limited to eggplant, white radish, carrot, sweet potato, potato, yam, tomato, peanut, sunflower, chili and soybean.

The concentration of the continuously produced ammonia via the present invention is not too high so as to avoid harming leaves and the reaction can carries out continuously. In practical applications, the solution for supplying ammonia can be combined with other nutrients (like phosphorus and potassium), and further used as foliar fertilizer.

The theoretical rate of ammonia production in the solution ranges from 10 to 2500 μmol/L/hour under sunlight. As calculated, if 450 L of the solution is sprayed per hectare for 3 hours of irradiation per day, the total nitrogen fertilizer reaches 189~47250 $mg/hm^2/day$.

Compared with the prior art, the present invention has the following merits:

(1) The present invention applies firstly photocatalysts and polyols as the "nitrogen source" on the leaves of the crops. Ammonia can be generated in-situ by dinitrogen, without adding nitrogenous fertilizer, enhancing the utilization of nitrogen and provide new insights into the field of agronomy.

(2) In the present invention, the solution for supplying ammonia has strong adhesive force and the ammonia evolution is continuous. Besides, the polyols should be added periodically. In this system, the generated ammonia can be absorbed and utilized simultaneously by plants, whose appropriate concentration will not harm leaves. As concluded, the fertilization is simple, secure and convenient.

(3) The polyols in the present invention can also act as moisturizers, which can absorb moisture from the surroundings when there is no light, so as to provide a reaction zone for ammonia production so as to promote the photocatalytic reaction.

(4) The environmentally friendly photocatalysts and biodegradable polyols adopted in the present invention will not cause environmental pollutions after entering soil.

DETAILED DESCRIPTION OF THE PREFERRED EMBODIMENT

In order to further clarify the objects, technical solutions, and advantages of the present invention, the present invention will be further described in detail below with reference to the embodiments. It should be understood that the specific embodiments described herein are only used to explain the present invention, but not to limit the present invention. Those skilled in the art can make modifications or equivalent substitutions based on their understanding of the technical solution of the present invention without departing from the spirit and scope of the technical solution of the present invention, and shall be covered by the protection scope of the present invention.

The raw materials used in the following illustrative embodiments are all purchased from the market, and "part" refers to part by mass.

Example 1

Photocatalyst Preparation 3 parts of HF solution (≥40 wt %) were added dropwise into 25 parts of tetrabutyl titanate. The mixture was stirred for 1 hour and then sealed. The mixture was put into an oven at 180° C. for 24 hours. After cooling, the sample was filtered and dried at 60° C. to obtain $TiO_2$.

1 part of $TiO_2$ photocatalyst was ultrasonically dispersed in 100 parts of water, then 0.1 part of urea was added and stirred for 1 hour. The solution was sealed and moved into an oven at 120° C. for 12 hours. After cooling, the sample was filtered and dried at 60° C. to obtain N doped $TiO_2$.

Preparation of Solution for Supplying Ammonia and Glycerol Solution

A certain amount of glycerol was dissolved in water and prepared into glycerol solution with a volume proportion of 5%. The solution for supplying ammonia was prepared by dissolving the sample (N doped $TiO_2$) in glycerol solution with a concentration of 250 mg/L.

Theoretical Ammonia Production Rate Determination 200 mL of the above solution for supplying ammonia was added into the reactor with a 300 W xenon lamp as simulated sunlight. Samples were taken every half hour with filtration and the concentrations of $NH_4^+$—N in the aqueous ammonia solution were measured by Nessler's reagent Spectrophotometry. The relationship curve of $NH_4^+$—N concentrations with times was drawn. The slope of the curve was the ammonia production rate and the result was shown in Table 1.

Crop Experiments:

10 days after the field planting of tomatoes (Jinguan 58), the solution for supplying ammonia was sprayed on the leaves of tomatoes, and the glycerol solution was sprayed every 15 days. The spraying time was 8:00-9:00 in the morning. Other conditions remained the same as normal. These mature tomatoes were randomly selected for determinations of vitamin C, soluble sugar and soluble protein through molybdenum blue spectrophotometry, anthrone colorimetry, and coomassie brilliant blue G-250 method, respectively, and the result was shown in Table 1.

Example 2

Photocatalyst Preparation 3 parts of HF solution (≥40 wt %) were added dropwise into 25 parts of tetrabutyl titanate. The mixture was stirred for 1 hour and then sealed. The mixture was put into an oven at 180° C. for 24 hours. After cooling, the sample was filtered and dried at 60° C. to obtain $TiO_2$.

1 part of $TiO_2$ photocatalyst was ultrasonically dispersed in 100 parts of water, then 0.4 part of $FeCl_2$ was added and stirred for 1 hour. The solution was sealed and moved into an oven at 100° C. for 12 hours. After cooling, the sample was filtered and dried at 60° C. to obtain Fe doped $TiO_2$.

Preparation of Solution for Supplying Ammonia and Butanetriol Solution

A certain amount of butanetriol was dissolved in water and prepared into butanetriol solution with a volume proportion of 5%. The solution for supplying ammonia was prepared by dissolving the sample (Fe doped $TiO_2$) in butanetriol solution with a concentration of 500 mg/L.

Theoretical Ammonia Production Rate Determination

The determination of ammonia production rate was the same as that in example 1, and the result was shown in Table 1.

Crop Experiments:

10 days after the field planting of pod peppers (Tianyu 3), the solution for supplying ammonia was sprayed on the leaves of pod peppers, and butanetriol solution was sprayed every 15 days. The spraying time was 8:00-9:00 in the morning. Other conditions remained the same as normal. These mature pod peppers were randomly selected for determinations of vitamin C, soluble sugar and soluble protein through molybdenum blue spectrophotometry, anthrone colorimetry, and coomassie brilliant blue G-250 method, respectively.

Example 3

Photocatalyst Preparation 7 parts of $Zn(CH_3COO)_2.9H_2O$ and 11 parts of NaOH were added into 100 parts of water. The mixture was stirred for 1 hour. The solution was sealed and moved into an oven at 100° C. for 12 hours. After cooling, the sample was filtered and dried at 60° C. to obtain ZnO.

0.2 part of graphene oxide was ultrasonically dispersed in 100 parts of water, then 1 part of photocatalyst ZnO was added and stirred for 1 hour. The solution was sealed and moved into an oven at 180° C. for 12 hours. After cooling, the sample was filtered and dried at 60° C. to obtain ZnO-reduced graphene oxide.

Preparation of Solution for Supplying Ammonia and Ethylene Glycol Solution

A certain amount of ethylene glycol was dissolved in water and prepared into ethylene glycol solution with a volume proportion of 6%. The solution for supplying ammonia was prepared by dissolving the sample (ZnO-reduced graphene oxide) in ethylene glycol solution with a concentration of 700 mg/L.

Theoretical Ammonia Production Rate Determination

The determination of ammonia production rate was the same as that in example 1, and the result was shown in Table 1.

Crop Experiments:

10 days after the field planting of eggplants (Xianfeng eggplant), the solution for supplying ammonia was sprayed on the leaves of eggplants, and ethylene glycol solution was sprayed every 15 days. The spraying time was 8:00-9:00 in the morning. Other conditions remained the same as normal. These mature eggplants were randomly selected for determinations of vitamin C, soluble sugar and soluble protein through molybdenum blue spectrophotometry, anthrone colorimetry, and coomassie brilliant blue G-250 method, respectively.

Example 4

Photocatalyst Preparation

Nitrogen-defected g-$C_3N_4$ was prepared by calcining 0.5 part of $(NH_4)_2S_2O_8$ and 1 part of melamine in muffle furnace at 500° C. for 120 min.

Preparation of Solution for Supplying Ammonia and Pentanediol Solution

A certain amount of pentanediol was dissolved in water and prepared into pentanediol solution with a volume proportion of 9%. The solution for supplying ammonia was prepared by dissolving the sample (nitrogen-defected g-$C_3N_4$) in pentanediol solution with a concentration of 1000 mg/L.

Theoretical Ammonia Production Rate Determination

The determination of ammonia production rate was the same as that in example 1, and the result was shown in Table 1.

Crop Experiments:

10 days after the field planting of tomatoes (Jinguan 58), the solution for supplying ammonia was sprayed on the leaves of tomatoes, and pentanediol solution was sprayed every 15 days. The spraying time was 8:00-9:00 in the morning. Other conditions remained the same as normal. These mature tomatoes were randomly selected for determinations of vitamin C, soluble sugar and soluble protein through molybdenum blue spectrophotometry, anthrone colorimetry, and coomassie brilliant blue G-250 method, respectively.

Example 5

Photocatalyst Preparation

G-$C_3N_4$ was prepared by calcining melamine in muffle furnace at 500° C. for 120 min.

1 part of g-$C_3N_4$ and 60 parts of $H_2O_2$ (10 wt %) were dispersed and mixed at 70° C. for 2 hours. The solution was sealed and moved into an oven at 140° C. for 1 hour. After cooling, the sample was filtered and dried at 60° C. to obtain O doped g-$C_3N_4$.

Preparation of Solution for Supplying Ammonia and Butanediol Solution

A certain amount of butanediol was dissolved in water and prepared into butanediol solution with a volume proportion of 10%. The solution for supplying ammonia was prepared by dissolving the sample (O doped g-$C_3N_4$) in butanediol solution with a concentration of 500 mg/L.

Theoretical Ammonia Production Rate Determination

The determination of ammonia production rate was the same as that in example 1, and the result was shown in Table 1.

Crop Experiments:

10 days after the field planting of pod peppers (Tianyu 3), the solution for supplying ammonia was sprayed on the leaves of pod peppers, and butanediol solution was sprayed every 15 days. The spraying time was 8:00-9:00 in the morning. Other conditions remained the same as normal. These mature pod peppers were randomly selected for determinations of vitamin C, soluble sugar and soluble protein through molybdenum blue spectrophotometry, anthrone colorimetry, and coomassie brilliant blue G-250 method, respectively.

Example 6

Photocatalyst Preparation 7 parts of Zn($CH_3COO$)$_2$·9$H_2O$ and 11 parts of NaOH were added into 100 parts of water. The mixture was stirred for 1 hour. The solution was sealed and moved into an oven at 100° C. for 12 hours. After cooling, the sample was filtered and dried at 60° C. to obtain ZnO.

0.4 part of $CuCl_2$ was ultrasonically dispersed in 100 parts of water, then 1 part of photocatalyst ZnO was added and stirred for 1 hour. The solution was sealed and moved into an oven at 100° C. for 12 hours. After cooling, the sample was filtered and dried at 60° C. to obtain Cu/ZnO.

Preparation of Solution for Supplying Ammonia and Propylene Glycol Solution

A certain amount of propylene glycol was dissolved in water and prepared into propylene glycol solution with a volume proportion of 5%. The solution for supplying ammonia was prepared by dissolving the sample (Cu/ZnO) in propylene glycol solution with a concentration of 800 mg/L.

Theoretical Ammonia Production Rate Determination

The determination of ammonia production rate was the same as that in example 1, and the result was shown in Table 1.

Crop Experiments:

10 days after the field planting of eggplants (Xianfeng eggplant), the solution for supplying ammonia was sprayed on the leaves of eggplants, and propylene glycol solution was sprayed every 15 days. The spraying time was 8:00-9:00 in the morning. Other conditions remained the same as normal. These mature eggplants were randomly selected for determinations of vitamin C, soluble sugar and soluble protein through molybdenum blue spectrophotometry, anthrone colorimetry, and coomassie brilliant blue G-250 method, respectively.

Control 1

10 days after the field planting of tomatoes (Jinguan 58), water was sprayed on the leaves of tomatoes every 15 days. The spraying time was 8:00-9:00 in the morning. Other conditions remained the same as normal. These mature tomatoes were randomly selected for determinations of vitamin C, soluble sugar and soluble protein through molybdenum blue spectrophotometry, anthrone colorimetry, and coomassie brilliant blue G-250 method, respectively.

Control 2

10 days after the field planting of pod peppers (Tianyu 3), water was sprayed on the leaves of pod peppers every 15 days. The spraying time was 8:00-9:00 in the morning. Other conditions remained the same as normal. These mature pod peppers were randomly selected for determinations of vitamin C, soluble sugar and soluble protein through molybdenum blue spectrophotometry, anthrone colorimetry, and coomassie brilliant blue G-250 method, respectively.

Control 3

10 days after the field planting of eggplants (Xianfeng eggplant), water was sprayed on the leaves of eggplants every 15 days. The spraying time was 8:00-9:00 in the morning. Other conditions remained the same as normal. These mature eggplants were randomly selected for determinations of vitamin C, soluble sugar and soluble protein through molybdenum blue spectrophotometry, anthrone colorimetry, and coomassie brilliant blue G-250 method, respectively.

Three experimental areas were selected to conduct these experiments, each with an area of 20 m². Each experimental or controlled trail was conducted in quintuplicate, and an averaging value was adopted as the final result, which was shown in Table 1.

The results in Table 1 showed that the supply system contain photocatalysts, polyols and water had considerable nitrogen fixation efficiency under simulated sunlight. Besides, the method for photocatalytic foliar fertilization was applied to crops, and it could be concluded that the method could generate absorbable ammonia on the leaves of crops. Comparing Examples 1-6 with Controls 1-3, the method could increase crop yield as well as enhance the content of vitamin C, soluble sugar and soluble protein. The results further verified that the method was capable of improving fruit quality of crops.

TABLE 1

The results of batch trails

| | Theoretical ammonia production rate (mmol/L/hour) | Application on crops | | | | |
|---|---|---|---|---|---|---|
| | | Species | Yield (g/stock) | Vitamin C (mg/kg, FW) | Soluble sugar (mg/g, FW) | Soluble protein (mg/g, FW) |
| Example 1 | 1.12 | tomato | 876 | 3.82 | 42.1 | 1.19 |
| Example 2 | 1.87 | pod pepper | 443 | 7.11 | 25.1 | 2.31 |
| Example 3 | 0.748 | eggplant | 784 | 4.25 | 29.5 | 3.26 |
| Example 4 | 0.824 | tomato | 796 | 4.39 | 35.6 | 1.35 |
| Example 5 | 1.68 | pod pepper | 517 | 7.47 | 19.7 | 2.74 |
| Example 6 | 1.27 | eggplant | 691 | 4.63 | 25.9 | 2.79 |
| Control 1 | — | tomato | 421 | 2.54 | 29.4 | 1.02 |
| Control 2 | — | pod pepper | 264 | 4.67 | 15.4 | 1.94 |
| Control 3 | — | eggplant | 447 | 3.49 | 22.4 | 0.73 |

The invention claimed is:

1. A method for photocatalytic foliar fertilization comprising the step of spraying a solution containing photocatalysts and hole sacrificial agents on leaves of crops to supply nitrogen fertilizer under sunlight;
    wherein the photocatalysts are nanocatalysts responding to the sunlight spectra, and the potential of conduction band for the photocatalysts is lower than −0.092 V (vs NHE);
    wherein the hole sacrificial agents are polyols;
    wherein the mass concentration of the photocatalysts in the solution is 100-2000 mg/L;
    wherein the volume fraction of the polyols accounts for 1%~20% in the solution.

2. The method for photocatalytic foliar fertilization of claim 1, wherein the mass concentration of photocatalysts in the solution is 250~1000 mg/L, and the volume fraction of the polyols accounts for 2.5%~10% in the solution.

3. The method for photocatalytic foliar fertilization of claim 1, wherein the nanocatalysts comprise one or more of vacancy-defected catalysts, non-metal doped catalysts, metal ion doped catalysts, and heterojunction catalysts.

4. The method for photocatalytic foliar fertilization of claim 3, wherein the vacancy-defected catalysts include nitrogen-defected $g-C_3N_4$ and oxygen-defected ZnO; the non-metal doped catalysts include N doped $TiO_2$ and O doped $g-C_3N_4$; the metal ion doping catalysts include Fe doped $TiO_2$ and Cu doped ZnO; the heterojunction catalysts include ZnO-reduced graphene oxide and $g-C_3N_4$—$TiO_2$.

5. The method for photocatalytic foliar fertilization of claim 1, wherein the polyols comprised one or more of ethylene glycol, propylene glycol, glycerol, butanediol, butanetriol and pentanediol.

6. The method for photocatalytic foliar fertilization of claim 1, wherein the solution is additionally sprayed periodically, and an interval ranges from 15 to 30 days.

7. The method for photocatalytic foliar fertilization of claim 6, wherein the volume fraction of the polyols in the solution is 2.5%~10%.

8. The method for photocatalytic foliar fertilization of claim 1, wherein edible parts of selected crops exclude leaves and the selected crops includes eggplant, white radish, carrot, sweet potato, potato, yam, tomato, peanut, sunflower, chili and soybean.

* * * * *